United States Patent
Davis et al.

(10) Patent No.: US 9,414,230 B2
(45) Date of Patent: Aug. 9, 2016

(54) CERTIFICATE MANAGEMENT WITH CONSEQUENCE INDICATION

(75) Inventors: Dinah Davis, Waterloo (CA); Michael S. Brown, Waterloo (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 916 days.

(21) Appl. No.: 12/258,906

(22) Filed: Oct. 27, 2008

(65) Prior Publication Data

US 2009/0144540 A1 Jun. 4, 2009

Related U.S. Application Data

(60) Provisional application No. 60/982,708, filed on Oct. 25, 2007.

(51) Int. Cl.

| | |
|---|---|
| *H04L 9/00* | (2006.01) |
| *H04W 12/08* | (2009.01) |
| *G06F 21/33* | (2013.01) |
| *G06F 21/35* | (2013.01) |
| *H04L 29/06* | (2006.01) |
| *H04L 9/32* | (2006.01) |

(52) U.S. Cl.
CPC .............. *H04W 12/08* (2013.01); *G06F 21/33* (2013.01); *G06F 21/35* (2013.01); *H04L 9/3234* (2013.01); *H04L 9/3268* (2013.01); *H04L 9/3271* (2013.01); *H04L 63/0823* (2013.01); *H04L 63/10* (2013.01); *H04L 2209/76* (2013.01); *H04L 2209/80* (2013.01); *H04L 2463/082* (2013.01)

(58) Field of Classification Search
USPC ........................................................ 713/156
See application file for complete search history.

(56) References Cited

U.S. PATENT DOCUMENTS

| | | |
|---|---|---|
| 5,214,702 A | 5/1993 | Fischer |
| 6,044,462 A | 3/2000 | Zubeldia et al. |
| 6,230,266 B1 | 5/2001 | Perlman et al. |
| 6,351,812 B1 | 2/2002 | Datar et al. |
| 6,792,531 B2 | 9/2004 | Heiden et al. |
| 6,914,985 B1 * | 7/2005 | Shrader et al. ................. 380/30 |
| 6,985,888 B1 | 1/2006 | Cordery et al. |
| 7,028,181 B1 | 4/2006 | McCullough et al. |

(Continued)

OTHER PUBLICATIONS

Adams, "Internet X.509 Public Key Infrastructure Certificate Management Protocol (CMP)," Sep. 2005.*

(Continued)

*Primary Examiner* — Andrew Georgandellis
(74) *Attorney, Agent, or Firm* — Ridout & Maybee LLP

(57) ABSTRACT

A certificate management operation request is managed on a device, access to which is governed by an authentication certificate. Upon receiving a request to perform a certificate management operation on a certificate, a consequence of performing the certificate management operation is determined and the consequence is indicated via a user interface of the device. For example, anytime a user attempts to use a certificate management application to delete, distrust or revoke a certificate, it is determined whether the certificate meets certain criteria, such as the certificate being the authentication certificate or being in the certificate chain of the authentication certificate. If the certificate meets the criteria, the user may be notified of a lack of permission to perform the requested operation and the operation may be prevented from completing. Alternatively, the user may be permitted to confirm the instruction to perform the requested operation, and the operation may be completed.

20 Claims, 7 Drawing Sheets

(56) References Cited

U.S. PATENT DOCUMENTS

| | | | |
|---|---|---|---|
| 7,174,563 | B1 | 2/2007 | Brownlie et al. |
| 7,386,722 | B2* | 6/2008 | Umezawa et al. ............ 713/156 |
| 2002/0078347 | A1 | 6/2002 | Hericourt et al. |
| 2002/0104000 | A1 | 8/2002 | Kang et al. |
| 2002/0184493 | A1* | 12/2002 | Rees ............................ 713/158 |
| 2003/0163636 | A1 | 8/2003 | Park |
| 2003/0236977 | A1 | 12/2003 | Levas et al. |
| 2004/0083359 | A1 | 4/2004 | Camus et al. |
| 2004/0168056 | A1 | 8/2004 | Dillaway et al. |
| 2004/0171369 | A1 | 9/2004 | Little et al. |
| 2005/0015586 | A1 | 1/2005 | Brickell |
| 2005/0114653 | A1 | 5/2005 | Sudia |
| 2005/0138365 | A1 | 6/2005 | Bellipady et al. |
| 2005/0229258 | A1 | 10/2005 | Pigin |
| 2006/0156391 | A1 | 7/2006 | Salowey |
| 2008/0125094 | A1 | 5/2008 | Heurtaux et al. |
| 2008/0148046 | A1* | 6/2008 | Glancey ........................ 713/156 |
| 2008/0229433 | A1 | 9/2008 | Chen |
| 2009/0232310 | A1* | 9/2009 | Holtmanns et al. ........... 380/277 |
| 2010/0050271 | A1* | 2/2010 | Saarisalo ........................ 726/28 |

OTHER PUBLICATIONS

Paul Hoffman, "Microsoft Windows Root Certificate Security Issues," Jul. 19, 2007.*

IBM, WebSphere. Configuring certificate expiration monitoring, Application Server, Version 6.1, Aug. 29, 2007, http://publib.boulder.ibm.com/infocenter/wasinfo/v6r1/index.jsp?topic=com.ibm.websphere.base.doc/infotaes/ae/tsec_ssiconfcertexpmon.html.

PCT International Search Report relating to International Application No. PCT/CA2008/001908 dated Feb. 6, 2009.

Hoffman, P., "Microsoft Windows Root Certificate Security Issues", Jul. 19, 2007; pp. 1-5, Retrieved from Internet Dec. 18, 2012; http://www.proper.com/root-cert-problem/.

Office Action; CA application No. 2,703,304; Jan. 22, 2013.

Extended European Search Report; EP application No. 08841685.4; Oct. 1, 2012.

Komer, Brian: "Troubleshooting Certificate status and revocation", Oct. 26, 2001; XP55038797; Retrieved from the internet—http://www.a-cert.at/static/microsoft-troublshooting-certificate-revocation.pdf (retrieved on Sep. 20, 2012).

EP Communication Pursuant to Article 94(3), Application No. 08841685.4, Dated Jul. 24, 2015.

"Online Certificate Status Protocol Mobile Profile; OMA-WAP-OCSP_MP-V1_0-20070403-A"; OMA-WAP-OCSP_MP-V1_0-20070403-A, Open Mobile Alliance (OMA),Dated Apr. 3, 2007, pp. 1-25, XP064021606, Retrieved from the Internet: URL:ftp/Public_documents/ARCH/ARC-SEC/Permanet_documents/.

* cited by examiner

CERTIFICATE MANAGEMENT WITH CONSEQUENCE INDICATION

CROSS REFERENCE TO RELATED APPLICATIONS

The present application claims priority to U.S. Provisional Patent Application Ser. No. 60/982,708, filed Oct. 25, 2007, the contents of which are hereby incorporated herein by reference.

FIELD OF THE INVENTION

The present application relates generally to computing device identity certificate management and, more specifically, to indication consequences of carrying out certificate management requests.

BACKGROUND OF THE INVENTION

User devices, including, but not restricted to, wireless mobile communication devices, personal computers, laptop or portable computers, smartphones, personal digital assistants (PDAs), and the like, may be secured from unauthorized access by means of an authentication process having one or more factors. Such an authentication process may require the user to establish a connection between the user device and an authorization token, e.g., a smart card, where the authorization token stores a secret value. The connection allows for validation, by the user device, before the user is allowed to access functions and/or data stores of the user device. It is known in the art to implement this type of authentication process using a Public Key Infrastructure (PKI), wherein the authentication token is provided with a private key and the user device is provided with a public key that corresponds to the private key. The user device may also be provided with an identity certificate. The identity certificate may be used by a third party to verify that the public key is reliably associated with the identity of the user device, or of the user of the user device.

In an example authentication process, the user device transmits a message to the authentication token. The authentication token generates a digital signature for a message using the private key. The authentication token then transmits the digital signature to the user device. The user device may then transmit the message and the digital signature to a message recipient. The message recipient can the use the public key to verify that the message was signed using the private key.

A identity certificate typically contains: a public key; an owner's name; an expiration date of the public key; the name of the issuer, the Certificate Authority (CA) that issued the identity certificate; a serial number for the identity certificate; and a digital signature of the issuer.

After the expiration date of the public key, the identity certificate is not intended to be relied upon for authentication purposes. When the expiration time is embedded in the identity certificate, the user device may ascertain whether the public key has expired. However, the CA may revoke an identity certificate sometime ahead of a predetermined expiry date, in which case the identity certificate is intended to be unusable for authentication purposes. As should be clear, up-to-date information is not embedded in the identity certificate previously stored at the user device. Therefore, to determine whether an identity certificate may be relied upon for authenticating a user, the user device must obtain the updated revocation status of the identity certificate at the time at which the user device uses the identity certificate to verify that a digital signature received in association with a received message was generated using the private key.

To assist the operation of some PKI systems, a certificate revocation list (CRL) is a list of identity certificates (more accurately: serial numbers of identity certificates) that have been revoked, that are no longer valid and that should not be relied upon. The user device may download a CRL over a network, e.g., the Internet, to obtain updated revocation information for an identity certificate before using the identity certificate to verify that a received message was signed using a corresponding private key.

The known Online Certificate Status Protocol (OCSP) is an Internet protocol used for obtaining the revocation status of an identity certificate. The OCSP is described in the Internet Engineering Task Force (IETF) Request For Comments (RFC) number 2560 and is on track to become an Internet standard. The OCSP was created as an alternative to CRLs, specifically addressing certain problems associated with using CRLs in a PKI. Messages communicated via OCSP are encoded in Abstract Syntax Notation One (ASN.1) and are usually communicated over the known Hyper-Text Transfer Protocol (HTTP). OCSP message exchanges have a "request/response" nature that leads to OCSP servers being termed OCSP responders.

Accordingly, in some PKI systems, the user device may query an OCSP responder over a network, e.g., the Internet, to obtain updated revocation information for an identity certificate before using the identity certificate to verify that a received message was signed using a corresponding private key.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
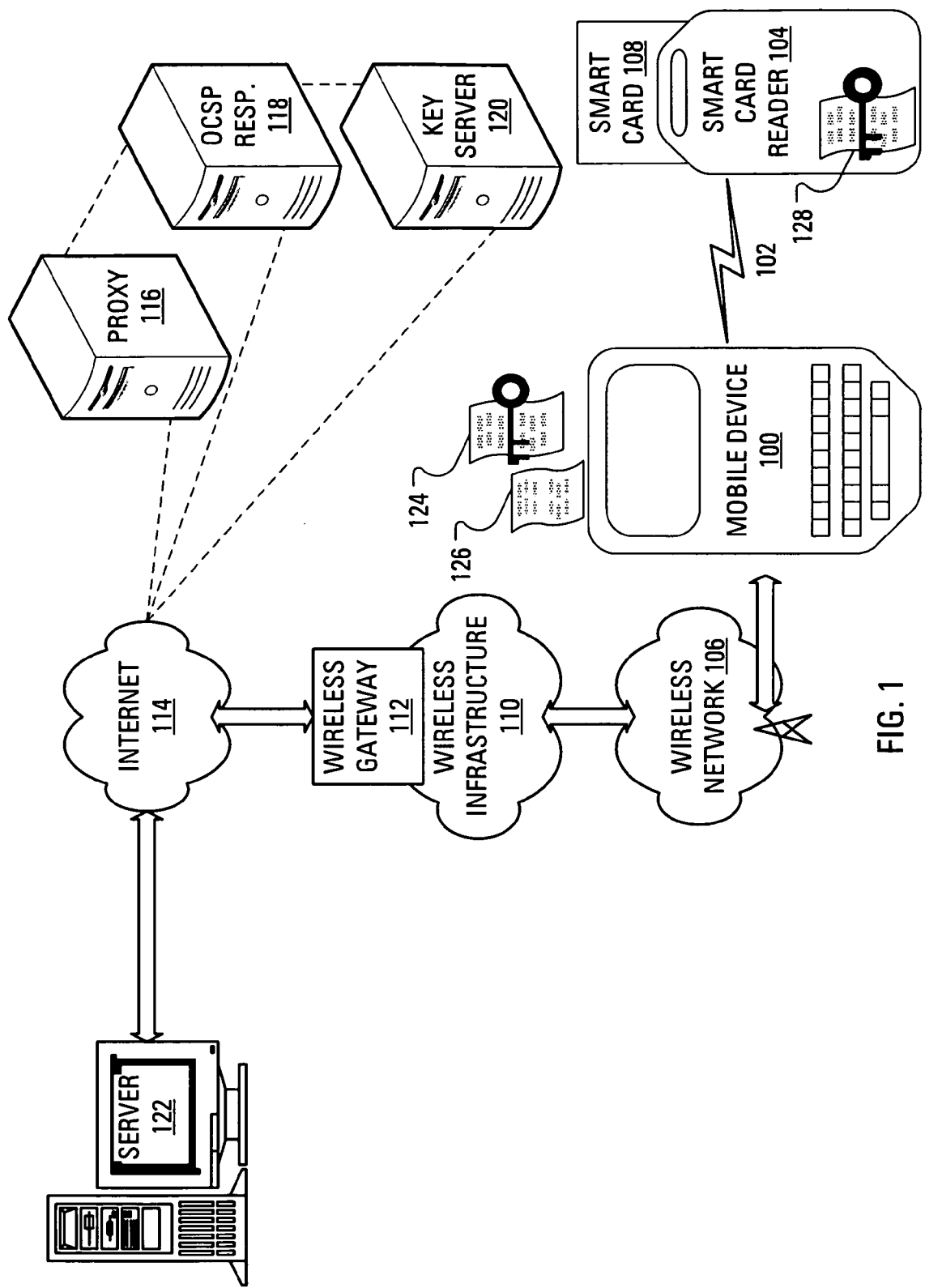
FIG. 1 illustrates an example system, including a mobile device and an access device, in which aspects of the present application find use.

If the user device is unable to obtain a CRL or query an OCSP responder for some reason, then, even if the user device successfully verifies that a received digital signature was generated using a given private key, the user device may not be able to trust the verification, since the user device may not be able to trust that the identity certificate that authenticates the public key associated with the given private key has not been revoked. In the case wherein the user device connects to a network wirelessly, an inability to obtain a CRL or query an OCSP responder may arise when the user device is outside of radio coverage. Alternatively, an inability to obtain a CRL or query a OCSP responder may arise when the user device is unable to connect to a wireless gateway, where the wireless gateway provides access to a network that is required to contact the OCSP responder or obtain a CRL.

In a situation wherein the user device is unable to trust a verification, a user may be blocked from accessing functions and/or data stores of the user device. That is, the user may be "locked out" of the user device, even if the user would be otherwise authorized to use the device, simply because a wireless network connection cannot be maintained.

Additionally, if the user is given access to a certificate management application, the user may attempt certificate management operations that, if performed, would lock the user out of the device.

A certificate management operation request is managed on a device, access to which is governed by an identity certificate. Upon receiving a request to perform a certificate management operation on a selected identity certificate, a consequence of performing the certificate management operation is determined and the consequence is indicated to a user of the device. For example, anytime a user attempts to use a certificate management application to delete, distrust or revoke a selected identity certificate, a condition that will lead to a change in a status of the selected identity certificate is detected. A consequence (e.g., self locking of the device) of the change in a status is then indicated and the request may be denied for lack of permission or the requested operation may be performed only after confirmation is received.

According to one aspect described herein, there is provided a method of managing identity certificates on a device. The method includes detecting a condition that will lead to a change in a status of an identity certificate from a current status to a new status and indicating, via a user interface of the device, a consequence of the change in status. In other aspects of the present application, a mobile communication device is provided for carrying out this method and a computer readable medium is provided for adapting a processor in a mobile communication device to carry out this method.

Other aspects and features of the present invention will become apparent to those of ordinary skill in the art upon review of the following description of specific embodiments of the invention in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the overview of FIG. 1.

FIG. 1 shows a user device in the form of a mobile communication device 100. It will be appreciated by those skilled in the art that the mobile communication device 100 may comprise any computing or communication device that is capable of connecting to a network by wireless means, including, but not limited to, personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The user device 100 may, for example, be connected to an Internet Service Provider on which a user of the system of FIG. 1, likely the user associated with the user device 100 illustrated in FIG. 1, has an account.

The user device 100 may be capable of sending and receiving messages and other data via wireless transmission and reception, as is typically done using electromagnetic waves in the radio frequency (RF) spectrum. The exchange of messages and other data may occur, for instance, between the user device 100 and a base station in a wireless network 106. The user device 100 may receive data by other means, for example through a direct connection to a port provided on the user device. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the user device 100 and the Internet 114 allows the user device 100 to access a proxy server 116 that is connected to the Internet 114. Also connected to the Internet 114 may be an OCSP responder 118 and a key server 120. Furthermore, the proxy server 116 may have a direct connection to the OCSP responder 118 and the OCSP responder 118 may have a direct connection to the key server 120. The proxy server 116 may be incorporated into a user's home network, for example at a message server 122 or another server in the user's home network.

In accordance with various embodiments, the user device 100 is capable of communicating with a security token access device, illustrated as a smart card reader 104, over a communication link 102. Notably, while the communication link 102 is illustrated as being wireless, it should be clear that the communication link 102 could also be a wired link. A non-exhaustive list of examples of wireless local area network standards for implementing the communication link 102 wirelessly includes the Institute of Electrical and Electronic Engineers (IEEE) Wireless Local Area Network Media Access Control and Physical layer (PHY) 802.11a, b, g and n specifications or future related standards, the Bluetooth® standard, the Zigbee™ standard and the like. The security token access device 104 may comprise a reader device or a read-write device. Thus, for example, if the security token access device 104 is a read-write device, the security token access device 104 may be configured to not only read data from an associated security token, but to also write data to the security token. It will be appreciated by those skilled in the art that the systems and methods disclosed herein may incorporate a security token access device that is capable of both reading and writing to a security token, and that the embodiments described herein are not limited to a security token reader device.

A security token, here shown as a smart card 108, is shown inserted into the security token access device 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an identity certificate, and may include a decryption engine, e.g., a processor and/or dedicated decryption logic. The functionality of the smart card may be embedded in a device having a different form factor and being capable of communicating over an additional communication protocol, e.g., the known USB communication protocol.

The security token 108 may include a connector for powering the semiconductor device and performing serial communication with an external device. The security token access device 104 may be provided in one of a number of form factors, including, but not limited to, a portable access device that can be worn on the person, for example by means of a lanyard (not shown) suspended around a user's neck. Alternatively, the security token access device 104 may be provided in a desktop reader or reader-writer form factor, or other form factor suitable for the security token environment that will be apparent to the skilled reader. In a further embodiment, the functionality of the security token 108 and the security token access device 104 may be integrated into a single unit.

The user device 100 may store an identity certificate 124 while the security token 108 may store a private key 128 corresponding to a public key associated with the identity certificate 124.

Figure 2:
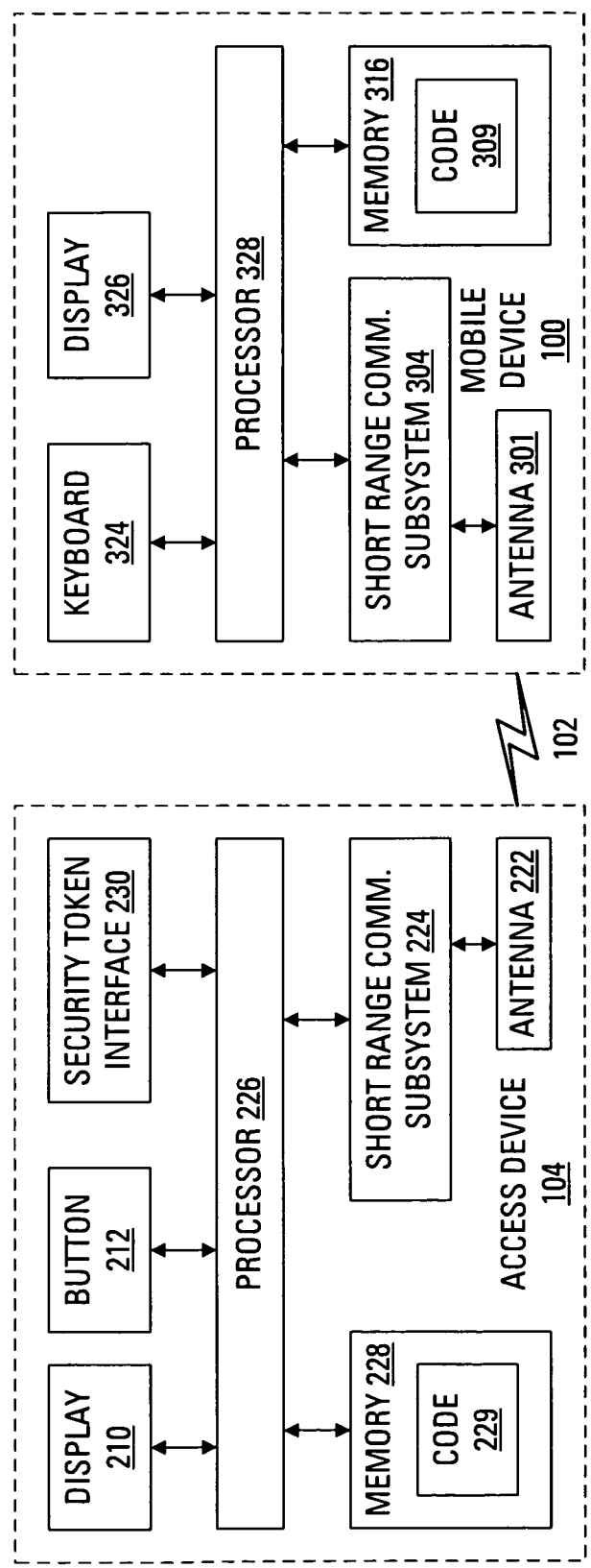
FIG. 2 schematically illustrates select components of the mobile device and the access device of FIG. 1.

While the configuration of security token access devices 104 and user devices 100 will be generally appreciated by those skilled in the art, FIG. 2 provides a schematic overview of select components of such devices. The security token access device 104 may comprise a processor 226, configured to execute code 229 stored in a memory element 228. The processor 226 and the memory element 228 may be provided on a single, application-specific integrated circuit, or the processor 226 and the memory element 228 may be provided in separate integrated circuits or other circuits configured to provide functionality for executing program instructions and storing program instructions and other data, respectively. The processor is connected to a security token interface 230. The memory 228 may comprise both volatile and non-volatile memory such as random access memory (RAM) and read-only memory (ROM). Sensitive information, such as keys and personal identification numbers (PINs), may be stored in volatile memory.

The code 229 provided in the security token access device 104 may include operating system software code, password verification code and code for specific applications and may be stored in non-volatile memory. For example, the code 229 may comprise drivers for the security token access device 104, code for managing the drivers and a protocol stack for communicating using a short-range communications subsystem 224, which is connected to an antenna 222. The short-range communications subsystem 224 includes a receiver and a transmitter (not shown). The short-range communications subsystem 224 may also comprise further processing means, such as a digital signal processor and local oscillators.

The access device 104 may also be configured to interface with the user via at least one input means and at least one output means. An example input means is a button 212, while an example output means is a display 210. The display 210 may be implemented as a single-line readout for displaying strings of alphanumeric characters. The access device 104 may also be provided with a further output means, not shown, such as a light emitting diode (LED), which may be tri-colored for indicating the status of the access device 104.

If the access device 104 is separate from the user device 100, the access device 104 may include a power supply (not shown), which, in the case of a portable security token access device, may be provided by at least one battery or power cell. A casing for the access device 104 may be configured such that removal of the casing disconnects the power supply, thereby clearing the volatile memory of the access device 104.

Components of the user device 100 include an input means, for example, a keyboard 324, although alternative or additional input means, such as thumbwheels, trackballs, touchpads and buttons, may also be provided. The user device 100 may also include an output means, such as a display 326. The input and output may be integrated, such as, for example, in a touchscreen display. As illustrated, the mobile device 100 includes an antenna 301 connected to a short-range communication subsystem 304, which, in turn, is communicatively connected to a processor 328. The short-range communication subsystem 304 may include similar components as the short-range communication subsystem 224 of the access device 104, such as a digital signal processor, local oscillator, a receiver and a transmitter. The processor 328 accesses a memory element 316 which stores code 309, which may include operating system software code and application-specific software code, as well as drivers and protocol stacks for handling communication over one or more communication links, such as the wireless communication link 102, as well as an authentication module for carrying out various processes to be described below.

The memory element 316 may include both volatile and non-volatile memory. The memory element 316 and the processor 328 may be provided in a single application-specific integrated circuit, or may be provided as separate components. The processor 328 may execute a number of applications that control basic operations, such as data and voice communications via the short-range communication subsystem 304, as well as a personal information manager that may be installed during manufacture and e-mail client for composing, editing, digitally signing and encrypting, and digitally verifying and decrypting messages.

The mobile device 100 includes a housing, an input device (e.g., the keyboard 324 having a plurality of keys) and an output device (the display 326), which may be a full graphic, or full color, Liquid Crystal Display (LCD). Other types of output devices may alternatively be utilized. A processing device (the microprocessor 328) is shown schematically in FIG. 3 as coupled between the keyboard 324 and the display 326. The microprocessor 328 controls the operation of the display 326, as well as the overall operation of the mobile device 100, in part, responsive to actuation of the keys on the keyboard 324 by a user.

The housing may be elongated vertically, or may take on other sizes and shapes (including clamshell housing structures). Where the keyboard 324 includes keys that are associated with at least one alphabetic character and at least one numeric character, the keyboard 324 may include a mode selection key, or other hardware or software, for switching between alphabetic entry and numeric entry.

Figure 3:
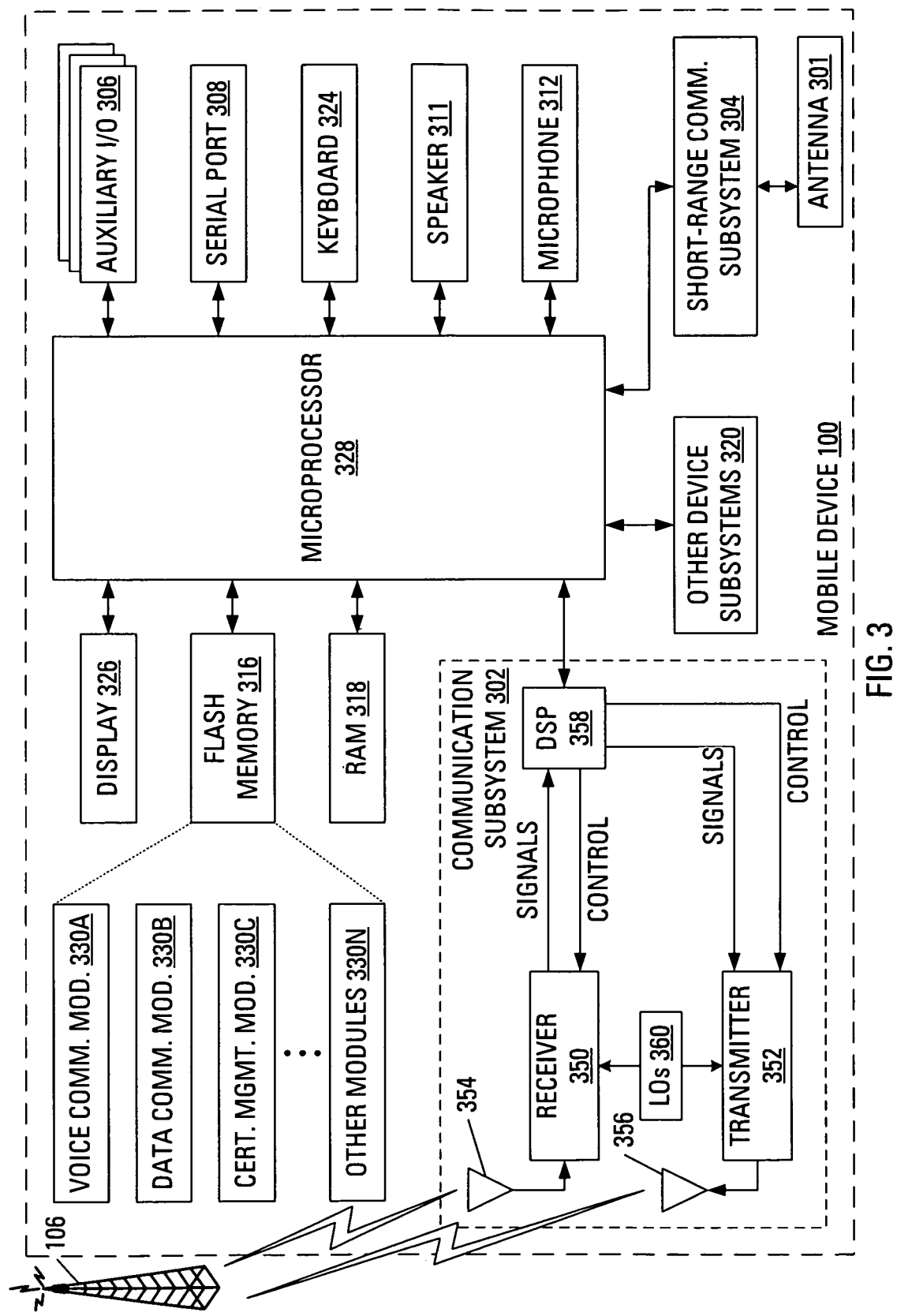
FIG. 3 illustrates a block diagram of a mobile communication device as an example of a device that may carry out a novel method of certificate management as presented herein.

In addition to the microprocessor 328, other parts of the mobile device 100 are shown schematically in FIG. 3. These include: the communications subsystem 302; a short-range communications subsystem 304; the keyboard 324 and the display 326, along with other input/output devices including a set of auxiliary I/O devices 306, a serial port 308, a speaker 311 and a microphone 312; as well as memory devices including the flash memory element 316 and a Random Access Memory (RAM) 318; and various other device subsystems 320. The mobile device 100 may be a two-way RF communication device having voice and data communication capabilities. In addition, the mobile device 100 may have the capability to communicate with other computer systems via the Internet 114.

Operating system software executed by the microprocessor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The microprocessor 328, in addition to its operating system functions, enables execution of software applications on the mobile device 100. A predetermined set of software applications that control basic device operations, such as a voice communications module 330A and a data communications module 330B, may be installed on the mobile device 100 during manufacture. A certificate management module 330C may also be installed on the mobile device 100 during manufacture, to implement aspects of the present application. As well, additional software modules, illustrated as another software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via the wireless carrier network 106 (see FIG. 1) represented by a radio tower. The data items managed by the PIM application may be seamlessly integrated, synchronized and updated via the wireless carrier network 106 with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the mobile device 100 is intended to operate. For example, the communication subsystem 302 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile device 100 may send and receive communication signals over the wireless carrier network 106. Signals received from the wireless carrier network 106 by the receive antenna 354 are routed to the receiver 350, which provides for signal amplification, frequency down conversion, filtering, channel selection, etc., and may also provide analog-to-digital conversion. Analog-to-digital conversion of the received signal allows the DSP 358 to perform more complex communication functions, such as demodulation and decoding. In a similar manner, signals to be transmitted to the wireless carrier network 106 are processed (e.g., modulated and encoded) by the DSP 358 and are then provided to the transmitter 352 for digital-to-analog conversion, frequency up conversion, filtering, amplification and transmission to the wireless carrier network 106 (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the microprocessor 328. The received signal is then further processed by the microprocessor 328 for output to the display 326, or alternatively to some auxiliary I/O devices 306. A device user may also compose data items, such as e-mail messages, using the keyboard 324 and/or some other auxiliary I/O device 306, such as a touchpad, a rocker switch, a thumb-wheel, a trackball, a touchscreen, or some other type of input device. The composed data items may then be transmitted over the wireless carrier network 106 via the communication subsystem 302.

In a voice communication mode, overall operation of the device is substantially similar to the data communication mode, except that received signals are output to a speaker 311, and signals for transmission are generated by a microphone 312. Alternative voice or audio I/O subsystems, such as a voice message recording subsystem, may also be implemented on the mobile communication device 100. In addition, the display 326 may also be utilized in voice communication mode, for example, to display the identity of a calling party, the duration of a voice call, or other voice call related information.

The short-range communications subsystem 304 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Referring again to FIG. 1, in typical operation, the user, who has security information stored on the security token 108, may use the access device 104 for identification and authentication to the user device 100 and, optionally, may use the access device 104 to digitally sign messages sent by the user device 100 and/or decrypt messages received by the user device 100. As one example, the user device 100 may be configured to send and receive e-mail. Furthermore, the user device 100 may be configured to employ the known Secure Multipurpose Internet Mail Extensions (S/MIME) protocol, such that some e-mail messages are received at the user device 100 after having been encrypted using a symmetric algorithm.

In such a symmetric algorithm, the sender of an e-mail message generates a random session key, encrypts the message with the session key, encrypts the session key with the recipient's public key and sends the encrypted message together with the encrypted session key. Where the recipient of the message is the user of the user device 100, upon receipt of the encrypted e-mail message and the encrypted session key, the user device 100 may extract the encrypted session key and send the encrypted session key to the access device 104 via the communication link 102, which may be a secure communication link. The access device 104 then transfers the encrypted session key to the security token 108. The decryption engine of the security token 108 may decrypt the encrypted session key using the recipient's private decryption key, which is stored in the security token 108. The access device 104 retrieves the decrypted session key from the security token 108 and forwards the decrypted session key to the user device 100 via the communication link 102. Upon receipt of the decrypted session key, the user device 100 can decrypt the encrypted e-mail message.

The security token 108 may prevent unauthorized use of the recipient's private decryption key by requiring that a password or personal identification number (PIN) be supplied at the user device 100 (and verified against a password or PIN stored at the security token 108 either in the clear or in an encoded form) before allowing the decryption operation to proceed.

Similarly, to add a digital signature to a new e-mail message or other message being sent by user device 100, the user device 100 may send a hash of the contents of the message to the access device 104 over the communication link 102. The access device 104 passes the hash to the security token 108. The security token 108 generates a digital signature from the hash and the sender's private signing key, which is stored in the security token 108. The security token 108 then passes the digital signature to the access device 104, which forwards the digital signature to the user device 100 via the communication link 102 so that the user device 100 can transmit the digital signature along with the message to the appropriate messaging server. A recipient of the message thus signed would procure a copy of the sender's identity certificate corresponding to the private signing key used to sign the message, and may verify the authenticity of the signed message using the public key contained within the sender's identity certificate. The recipient may also check the status of the sender's identity certificate to confirm that the identity certificate is still valid, e.g., that the identity certificate has not been revoked.

Again, the security token 108 may prevent unauthorized use of the sender's private signing key by requiring that a password or PIN be supplied before allowing the signing operation to proceed.

Further, the user device 100 may be configured to require user authentication before allowing the user to access some or all of the data stores or functionality of the user device 100. In accordance with various embodiments, two-factor authentication may be employed. In other embodiments, fewer or more than two factors may be employed. In accordance with one embodiment of two-factor authentication, the user must provide a token such as the security token 108 comprising authentication information associated with that user that is capable of verification by a third party, and in addition, the user is also required to enter a predetermined password or other personal identification number (PIN) using an input device on the mobile device 100. This password may be stored in the clear in the non-volatile memory of the mobile device 100, or stored in a hashed, salted and hashed, or encrypted form in the device memory. If two-factor authentication is employed, then the user is authenticated to the mobile device 100 upon verification by the mobile device 100 of both the user-entered password and the response from the user-supplied authentication token 108. If the verification fails, then the mobile device 100 remains locked to the user. Again, the various algorithms by which a challenge may be issued, signed or encrypted, and verified, will be known to those skilled in the art. In a further one-factor authentication embodiment, the password or PIN verification may be omitted.

With reference to FIG. 1, in accordance with various embodiments, authentication by an authentication token, such as a smart card, is enabled on the user device 100. The user device 100 is provided with authentication information such as the identity certificate 124 comprising key data which is to be used for user authentication. The user device 100 may be supplied with a number of identity certificates stored in memory; for example, the identity certificate 124 may be an authentication certificate designated for use in verifying the identity of the user at login, or when the user attempts to access certain functions or data on the user device 100. A further identity certificate stored at the user device 100 may be designated for use as a signing certificate (not shown) for signing or encrypting messages, as described above. Various asymmetric or elliptical key algorithms and the like, and the format and utilization of identity certificates for signing, verifying, encrypting or decrypting messages, or for verifying a user's identity, will be known to those skilled in the art. In the exemplary embodiment described here, the authentication information comprises the identity certificate 124, which itself comprises a public key, likewise stored at the mobile device 100.

The authentication information may comprise security information associated with the user by a trusted issuing authority such as a CA, as will be understood by those skilled in the art; thus, in one embodiment, the security token 108 stores a private key while a corresponding public key, typically associated with an identity certificate, may be made available to third parties and is provided to, and stored at, the user device 100.

As noted previously, the validity of authentication information such as an identity certificate, where "validity" relates to whether the authentication information should be relied upon to authenticate the identity of the user presenting the authentication information, is determined by the expiration date of the authentication information and the revocation status of the authentication information.

For example, authentication information such as an identity certificate may be provided with an embedded expiration date, the passing of which may be determined with reference to an internal clock by any device in possession of a replica of the identity certificate.

By contrast, the revocation status of an identity certificate is not embedded in the identity certificate itself; the revocation status information is obtained from sources external to the user device 100. The validity of the authentication information may further be determined by the "trust status" of the authentication information. The trust status relates to whether the authentication information is either inherently or explicitly trusted by the user device 100 or by the user's network.

Furthermore, a given identity certificate may be a certificate in a chain of certificates. As will be understood by those skilled in the art, a certificate chain is a sequence of certificates in which each subsequent certificate is signed with a signature whose validity can be authenticated through use of the certificate preceding it in the chain. Thus, the validity of a given identity certificate may be verified not only with reference to the expiration date, revocation status, or trust status of the identity certificate itself, but also with reference to the expiration date and revocation status of each of the certificates preceding the given certificate in the certificate chain.

For example, turning back to FIG. 1, the status of an identity certificate may be found in a CRL. While the certification authority that issued the identity certificate in the first place is typically the entity that may revoke the identity certificate, the server responsible for maintaining a CRL, or the server queried in order to determine the status of a given identity certificate, is not necessarily at the certification authority. For example, a CRL may be maintained at the key server 120. When the key server 120 receives a notification that an identity certificate has been revoked, the key server 120 updates the CRL to reflect the revocation; the key server 120 may then either "push" notifications and/or copies of the CRL to other points on the network, or the key server 120 may simply allow other servers or devices on the network to access the CRL and "pull" the data from the key server 120. For example, the OCSP responder 118 may pull the CRL on a periodic basis from the key server 120.

The OCSP responder 118, itself, receives queries from devices over the Internet 114 regarding the status of a various identity certificates and transmits responses to those devices over the Internet 114. Further, the proxy server 116 may be connected to the Internet 114 and may respond, over the Internet 114, to requests from other devices regarding identity certificate status. The proxy server 116 itself may maintain a cache of identity certificate status, which cache the proxy server 116 updates by querying the OCSP responder 118. The proxy server 116 may be incorporated into a user's home network, for example at the message server 122 or at another server in that local network. Thus, to check the status of an identity certificate, a user device generally communicates over the wireless network 106 and the Internet 114 with a server.

However, it is desirable to avoid the delay incurred by obtaining information from an identity certificate status source such as the proxy server 116, the OCSP responder 118 or the key server 120. Further, if the user device 100 is unable to access the wireless network 106 or the Internet 114 when a user attempts to log in, in the prior art system of user authentication wherein the identity certificate 124 is an authentication certificate 124, the user device 100 would not be able to determine the status of the authentication certificate 124. Accordingly, the user device 100 would not allow the user to be authenticated to the user device 100. The user would, therefore, remain locked out of the functions and/or data stores of the user device 100.

Thus, in accordance with various embodiments, the user device 100 stores, in non-volatile memory, not only the authentication certificate 124, but also a status indicator 126. The status indicator 126 comprises status information for the authentication certificate 124. The status indicator 126 may comprise a subset of a CRL or a response from a certificate status source such as the proxy server 116 or the OCSP responder 118. The status indicator 126 may further comprise a timestamp, representing the last time that the status indicator 126 had been refreshed in the memory of the user device 100 and, optionally, an identifier of the source of the certificate status, such as the key server 120, the OCSP responder 118 or the proxy server 116.

In various embodiments, the status represented in the status indicator 126 may be indicated as being "valid", "revoked" or "on hold". A status such as "on hold" may be a subcategory of "revoked"; if subcategories of "revoked" status are provided, then the status indicator may also comprise a reason code as well, which reason code provides a further explanation why the identity certificate was revoked. The "on hold" status may mean that an administrator may have reason to believe that the private key 128 corresponding to the authentication certificate 124 has been compromised for some reason. For example, the user may have reported that he or she had misplaced the security token 108, which may prompt an administrator to change the status of the authentication certificate 124 to "revoked" and/or "on hold". If the user had reported the security token 108 stolen, then the status indicator 126 would indicate "revoked" and the reason code may indicate "stolen" or may be blank. This status information may first be updated at the source CRL, or other certificate status source, and would be updated at the user device 100 as described below. Other revocation reasons will be apparent to those skilled in the art. It will also be apparent that the certificate status need not literally comprise indicators such as "revoked" or "on hold"; the status indicator 126 may be encoded in any appropriate format. For example, the status indicator 126 may comprise numeric codes which may be interpreted by a human with reference to an established information technology policy for that user device 100.

When the user device 100 checks the validity of the authentication certificate 124, the user device 100 not only checks that the authentication certificate 124 has not expired but, also, checks the status indicator 126 stored at the user device 100 to determine that the authentication certificate 124 is valid. A "valid" authentication certificate may be considered to be one that is not expired and is not revoked; however, in a further embodiment, a policy may be implemented at the user device 100 such that if the status indicator 126 indicates that the authentication certificate 124 is revoked for a particular reason—for example, if the authentication certificate 124 is "on hold"—the user device 100 may still deem the authentication certificate 124 to be valid until the status indicator 126 is updated to indicate that the authentication certificate 124 is revoked for another reason, such as "stolen". In still a further embodiment, while the user device 100 may be configured to authenticate the user with an "on hold" certificate, the access granted to the user may be limited to access to only a subset of user data and functions on the user device 100.

For example, the user of the user device 100 may only be permitted to make outgoing calls or send outgoing messages using the device 100 and may not be permitted to access the data stores or encrypted data until the authentication certificate 124 status is updated in the status indicator 126 to be "valid" and unexpired. Alternatively, the user may only be permitted to access a message inbox or other personal information management data, provided the data is not stored in encrypted form on the user device 100. Depending on the information technology policy implemented at the user device 100, a "valid" authentication certificate 124 may instead be defined as an identity certificate that meets at least one of the following conditions: not expired, not revoked, and trusted, or that meets at least two of these conditions. Alternatively, a "valid" authentication certificate 124 may be defined as an identity certificate that meets at least one or at least two of the three conditions of not expired, not revoked, and trusted, provided that any certificates preceding it in a certificate chain are not expired and not revoked.

In accordance with various embodiments, the user device 100 is further configured to perform background updates of the status indicator 126. Even while the user is authenticated to the user device 100, the user device 100 periodically queries the status of the authentication certificate 124 by contacting a certificate status source, for example the OCSP responder 118 or the proxy 116, and querying the status of the authentication certificate 124. This query may be made at the expiry of a first predetermined time interval, for example, once every 60 minutes, or at another first predetermined time interval configurable at the user device 100 or in an information technology policy or other security rule provided to the user device 100. The user device may contact the key server 120 to obtain a copy of an updated CRL, although this would likely consume more bandwidth and be less desirable. The frequency at which the user device 100 transmits these queries is set at a first frequency that may be determined by an administrator and, for example, established in an information technology policy implemented at the user device 100; this first frequency may be once a day or once an hour. If the user device 100 receives a response, then the status indicator 126 is updated at the user device 100 and a determination is made whether the authentication certificate 124, which had been used to authenticate the user as described earlier, is still valid. If the authentication certificate 124 is still valid according to the status indicator 126, the user access to the functions and/or data stores of the device 100 is maintained and the user may not detect any interruption in his or her operation of the device. If the status indicator 126 indicates that the authentication certificate 124 is now invalid because the authentication certificate 124 is revoked, then the user's active session may terminate, and the authentication module may lock the user out of the user device 100 immediately. In a further embodiment, the user device 100 may be configured to automatically delete user data, such as inbox messages, calendar, or personal information management data, if the authentication certificate is revoked. However, if the status indicator 126 indicates that the authentication certificate 124 is merely "on hold", then the user's active session may terminate and the authentication module may lock the user out of the user device 100. In a further embodiment, the user device 100 may be configured to offer the user the option to terminate the session lock the device 100, or may provide the user with a warning that failure to remove the "on hold" status within a set period of time will result in termination of the session and locking out the user.

Additionally, while locked out of a device because the authentication certificate 124 is "on hold", the user may be allowed to check the status of the authentication certificate 124 to see if the certificate status has changed back to "valid".

During these repeated determinations of whether the authentication certificate 124 is valid, it will be appreciated that the determination of validity may also comprise a check to determine whether the authentication certificate 124 is still unexpired. In one embodiment, if an authentication certificate ceases to be valid because it is expired, but it is not revoked and is otherwise in good standing, the user is not immediately locked out of the user device 100; rather, the user device 100 is configured to allow the user's session to end at the user's discretion, but the next time the user attempts to log into the device, the user will be locked out until a new authentication certificate is supplied to the user device 100, or the now-expired authentication certificate is renewed.

If, however, a response is not received (a response may be deemed to have not been received if a predetermined timeout occurs or if the response comprises an error, for example) then the user device 100 repeats its query to the certificate status source. There are many reasons why a response may not be received; the OCSP responder 118 or the proxy server 116 may be down, or the user device 100, if wireless, may be unable to access the wireless gateway 112, or even if the wireless gateway 112 is accessible, contact with the certificate status source through the Internet 114 may fail. Therefore, the user device 100 attempts to repeat the query until a response is received. The time interval before subsequent queries may vary until a response is received. After a first error is received or a first predetermined timeout occurs, the query may be repeated after a first time interval, for example, five minutes. If an error is again received or if a predetermined timeout again occurs, the query may be repeated after a second, longer time interval, for example, 10 minutes. Upon subsequent errors or timeouts, the time interval before a further query may be increased until a response is received; in this embodiment, the time interval may be increased until the interval reaches the first predetermined time interval. For example, if the first predetermined time interval is 60 minutes, when repeated errors are received or repeated timeouts occur in response to certificate status queries from the user device 100, the user device 100 may attempt to repeat the query after five minutes, 10 minutes, 20 minutes and 40 minutes and then, after 60 minute intervals thereafter. Thus, in this embodiment, if the conditions giving rise to the first error received or the first timeout detected by the user device 100 are only temporary, by making the initial reattempts at shorter intervals, a successful result to the reattempted query will be realized sooner; if the conditions giving rise to the receipt of an error or detection of a timeout at the user device 100 persist, then subsequent attempts to query the certificate status are made at longer intervals until the first predetermined time interval is reached.

In a further embodiment, with each failed attempt to receive a response, the time interval before the next query attempt is reduced. In other words, the request attempts are made with decreasing time intervals until a predetermined minimum time interval is reached. For example, if the first predetermined time interval is once per hour, if a first query fails, the first query attempt may be made 30 minutes later; if the first query attempt fails, then the second query attempt may be made 15 minutes later; and if the second query attempt fails, then the third query attempt may be made five minutes later; but if the third query attempt fails, subsequent query attempts are still made at five minute intervals. Once a query attempt succeeds and a response is received, the time interval at which queries are made returns to the first predetermined time interval.

In addition, the user device 100 may also be configured to allow the user to force an update to the status indicator at any time, rather than wait for the next scheduled update attempt.

It will be appreciated that the background update procedure may be executed by the user device 100, even if the user is not currently authenticated to the device. In that case, of course, there is no need to terminate a user's access to the device in the event that the status indicator 126 is updated to indicate that the authentication certificate 124 is revoked.

Thus, it can be seen that, even if the user device 100 is unable to connect to a network over a wireless gateway and is unable to determine the current status of the authentication certificate 124 from a source on the network, the user will still be able to log in to the user device 100 depending on the certificate status information stored in the status indicator 126 on the user device 100. In various embodiments, the user device 100 refers to the status indicator 126 during the authentication process, whether the user device 100 is able to connect wirelessly to a network or not. This enhances the user experience since the likelihood of delay during login and the likelihood that a legitimate user will be locked out due to a lack of radio coverage is reduced.

As noted above, the user device 100 may store a number of identity certificates. In various embodiments, background updating of a status indicator for an identity certificate is only carried out for a single certificate, namely, the identity certificate designated as the one to be used in authenticating a user to the user device 100. In further embodiments, the user device 100 may carry out the background update process for more than one certificate using the same or a different update schedule; for example, while the status indicator 126 for the authentication certificate 124 is updated hourly, the status indicator for a sender's identity certificate stored at the user device 100 and used to verify the authenticity of a signed message received at the user device 100 may be updated only daily, while the status indicator for an identity certificate used by the user to digitally sign messages that are outbound from the user device 100 may be updated only weekly.

If a given identity certificate is a certificate in a chain of certificates, then the user device 100 may store the certificates preceding the given identity certificate in the chain of certificates. Thus, in addition to carrying out the background update process to update the status indicator 126 for the authentication certificate 124, the user device may carry out the background update process and update the status indicators corresponding to each of the certificates preceding the authentication certificate 124 in the chain as well. If the status indicator at the user device 100 for each of the certificates in the chain of certificates indicates that the corresponding identity certificate is "valid", then, provided that the status of the authentication certificate 124 itself permits the user to access some or all of the functions and data on the user device 100, the user will be provided such access. If the status indicator for a particular identity certificate in the chain of certificates, besides the authentication certificate 124 itself, indicates that the particular identity certificate has been "revoked", then the user will be denied access to the functions or data on the user device 100.

In yet a further embodiment, each time the validity of the certificate is checked, the age of the status indicator 126 is also verified to ensure that the status indicator 126 has not aged beyond a predetermined threshold, for example, one week. If the status indicator 126 has a timestamp that is older than a predetermined threshold, then the authentication certificate 124 may be deemed invalid even though the authentication certificate 124 is, otherwise, unexpired and not revoked, according to the status indicator 126.

Optionally, the above system and method for authenticating a user with reference to the status indicator 126 may be employed only when the user device 100 is unable to connect to a wireless network, either because it is outside of radio coverage or the radio in the device is turned off. If the user device 100 is able to connect to a wireless network, then, upon user request for access, the user device 100 attempts to obtain updated status information from a certificate status source such as the OCSP responder 118 or the proxy server 116.

In yet another embodiment, the ability to use the locally cached certificate status in the status indicator 126 is reserved only for the authentication certificate 124; for all other identity certificates, such as those used for signing messages, the user device 100 must obtain updated status information from a certificate status source such as the OCSP responder 118 or the proxy server 116.

In review, a feature has been described above in which the user device 100 periodically checks the status of an identity certificate and caches the certificate status locally in a status indicator. In some embodiments, the processor 328 may lock the user device 100 if the status of the authentication certificate 124, as stored in the status indicator 126, is "revoked" or if the status of any identity certificate in the certificate chain of the authentication certificate 124 is "revoked". Furthermore, the processor 328 may lock the user device 100 if the authentication certificate 124 expires.

As part of a certificate management application executed by the processor 328, the user of the user device 100 may be provided with an interface to manage the identity certificates stored at the user device 100. As part of such an application, the user may be provided with an ability to determine an expiry date for an identity certificate. As another part of such an application, the user may be provided with an ability to revoke identity certificates stored on the user device 100. As an additional part of such an application, the user may be provided with an ability to distrust identity certificates stored on the user device 100. However, responsive to the user revoking or distrusting an authentication certificate, the processor 328 may lock the user device 100. Furthermore, the user device 100 may be locked by the processor 328 upon expiry of an authentication certificate.

When this feature is enabled, the user device 100 periodically checks the status of the authentication certificate 124 every predetermined number of minutes as specified by, for example, a user setting or a policy provided to the user device 100. The status of the authentication certificate 124 may be checked periodically using the appropriate servers. The appropriate servers may be defined within the authentication certificate 124, in a certificate servers options entry, and may include the OCSP responder 118 and the key server 120. If the status of the authentication certificate 124 becomes "revoked", the processor 328 may lock the user device 100.

It is possible for the user to change the status of an identity certificate, both directly and indirectly, in such a way that, if this feature is enabled, the user would be permanently locked out of the user device 100.

In overview, proactive detection of conditions that would cause the user to be locked out of the user device 100 prevents unintentional device locking. For example, using a certificate management application, a user may take steps to revoke the authentication certificate 124. Where the above-described feature is enabled, the processor 328 may detect conditions that will lead to a change in status of the authentication certificate 124, where the change in status may cause the processor 328 to lock the user device 100. Conveniently, it is proposed herein to detect the user attempt to revoke the authentication certificate 124 and, responsively, to provide the user with information regarding taking such action. The information may include an indication of whether the user has permission to revoke the authentication certificate 124. Furthermore, the information may include an indication of the consequences of revoking the authentication certificate 124, for example, self locking of the user device 100.

In another example, using the certificate management application, a user may take steps to "distrust" the authentication certificate 124. Where the above-described feature is enabled, the processor 328 may detect conditions that will lead to a change in status of the authentication certificate 124, where the change in status may cause the processor 328 to lock the user device 100. Conveniently, it is proposed herein to detect the user attempt to distrust the authentication certificate 124 and, responsively, to provide the user with information regarding taking such action. The information may include an indication of whether the user has permission to distrust the authentication certificate 124. Furthermore, the information may include an indication of the consequences of distrusting the authentication certificate 124, for example, self locking of the user device 100.

In another example, using the certificate management application, a user may take steps to delete the authentication certificate 124. Where the above-described feature is enabled, the processor 328 may detect conditions that will lead to a change in status of the authentication certificate 124, where the change in status may cause the processor 328 to lock the user device 100. Conveniently, it is proposed herein to detect the user attempt to delete the authentication certificate 124 and, responsively, to provide the user with information regarding taking such action. The information may include an indication of whether the user has permission to delete the authentication certificate 124. Furthermore, the information may include an indication of the consequences of deleting the authentication certificate 124, for example, self locking of the user device 100.

Figure 4:
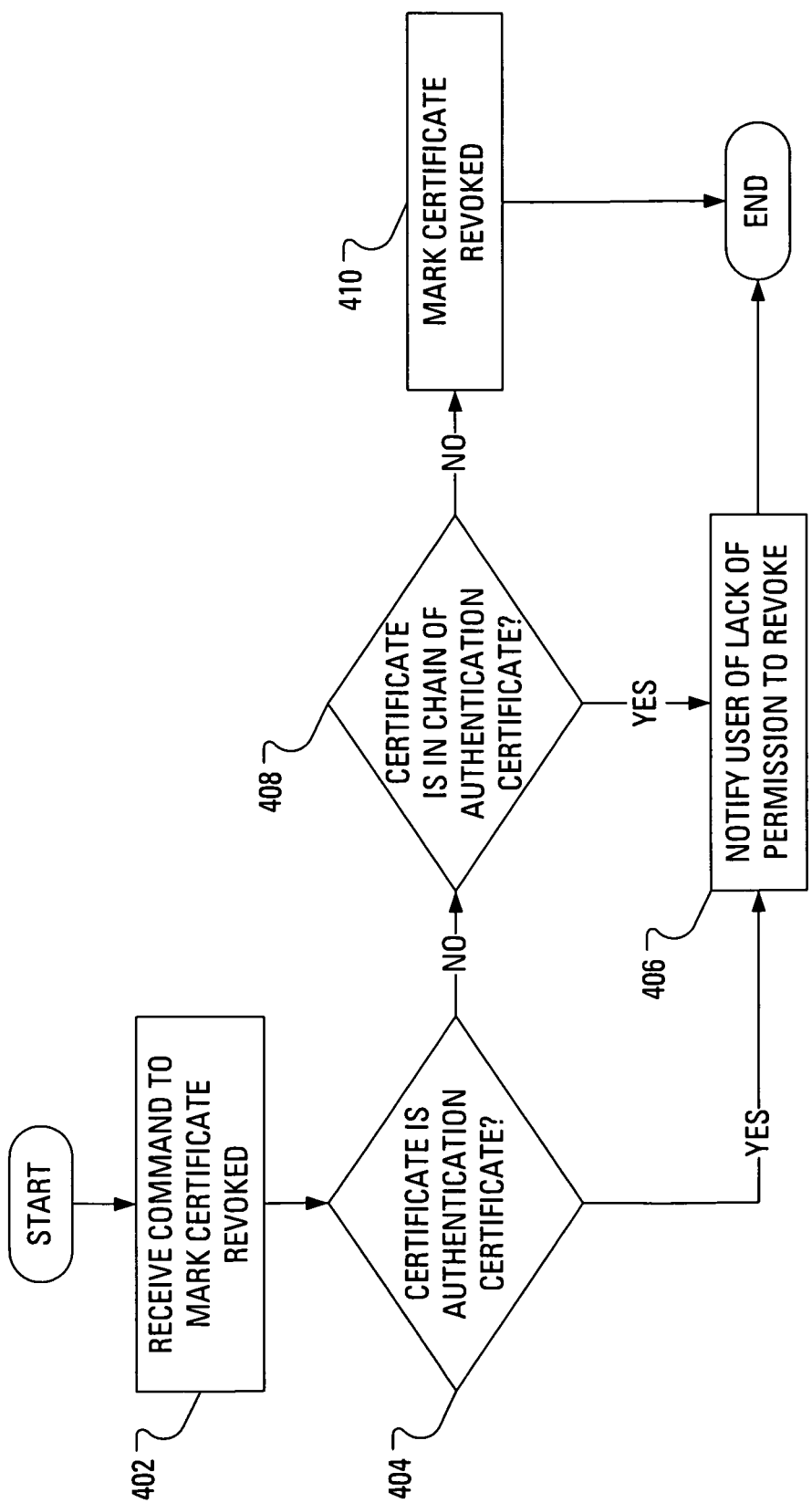
FIG. 4 illustrates steps of an example method of handling a certificate revocation request.

Steps of an example method of handling a certificate revocation request are presented in FIG. 4. Initially, the processor 328 receives (step 402) a command to mark a specific identity certificate as revoked. The command may be generated responsive to manipulation by the user of one or more input devices, such as the keyboard 324, to select an identity certificate in a certificate management application, to cause a menu to appear and to select a "Mark this Certificate Revoked" menu item from the menu. Responsive to receiving the command, the processor 328 determines (step 404) whether the selected identity certificate is the authentication certificate 124.

Where the processor 328 determines (step 404) that the selected identity certificate is the authentication certificate 124, the processor 328 indicates (step 406) to the user, perhaps through controlling the display 326 to show a dialog box, that, as a consequence of revoking the selected identity certificate, the user device 100 would become locked and that, accordingly, the user lacks permission to mark the authentication certificate 124 revoked. Alternatively, the processor 328 may issue (step 406) a notification that that the user lacks permission to mark the authentication certificate 124 revoked without indicating consequences.

Responsive to determining (step 404) that the selected identity certificate is not the authentication certificate 124, the processor 328 determines (step 408) whether the selected identity certificate is in the certificate chain of the authentication certificate 124. Where the processor 328 determines (step 408) that the selected identity certificate is in the certificate chain of the authentication certificate 124, the processor 328 indicates (step 406) to the user that, as a consequence of revoking the selected identity certificate, the user device 100 would become locked and that, accordingly, the user lacks permission to mark the selected identity certificate 124 revoked. Alternatively, the processor 328 may issue (step 406) a notification that that the user lacks permission to mark the authentication certificate 124 revoked without indicating consequences.

Responsive to determining (step 408) that the selected identity certificate is not in the certificate chain of the authentication certificate 124, the processor 328 marks (step 410) the selected identity certificate revoked. More accurately, the processor 328 amends a status field in a status indicator associated with the selected identity certificate so that the status field indicates that the selected identity certificate has been revoked.

Figure 5:
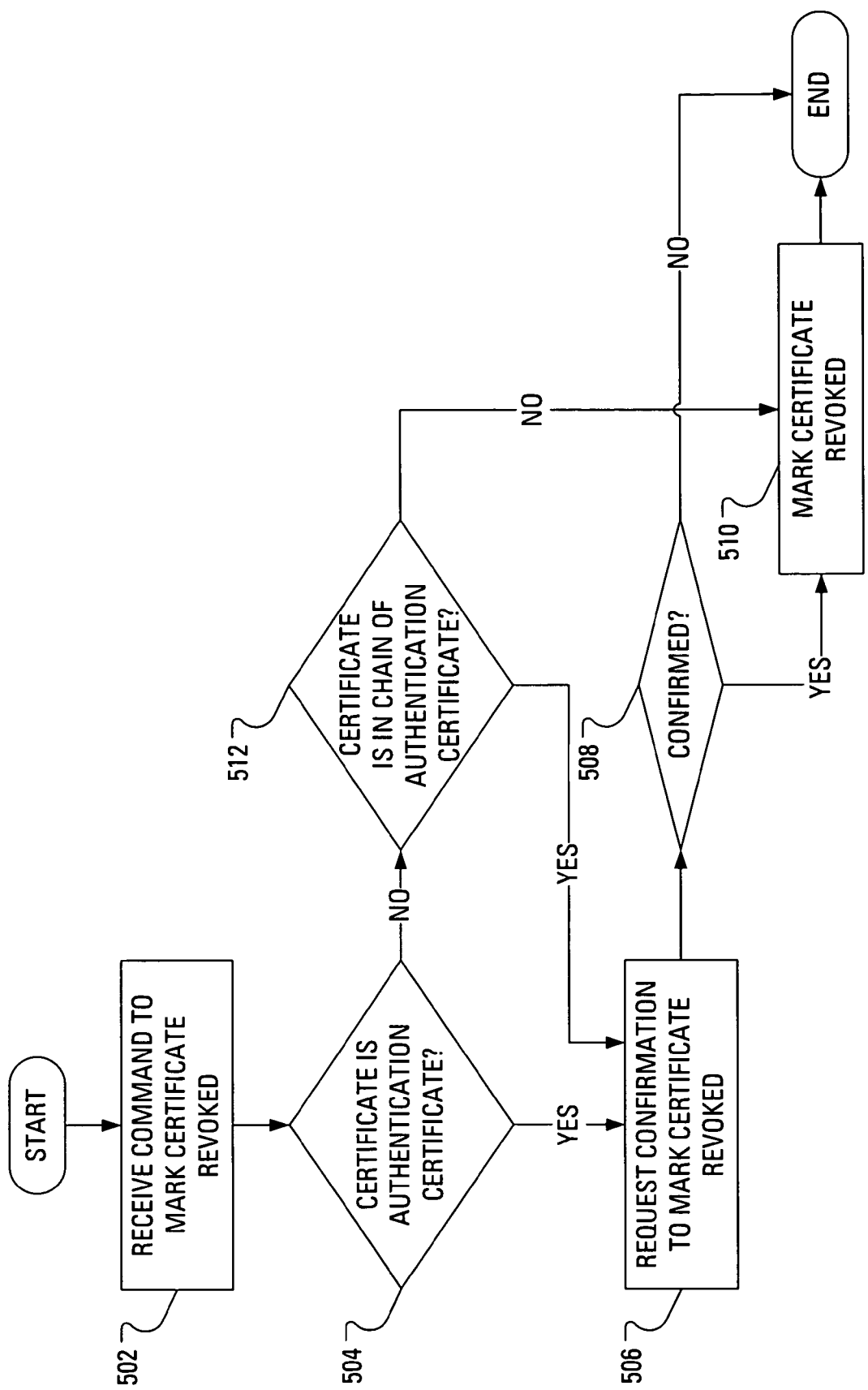
FIG. 5 illustrates steps of an alternative example method of handling a certificate revocation request.

Steps of an alternative example method of handling a certificate revocation request are presented in FIG. 5. Initially, the processor 328 receives (step 502) a command to mark a specific identity certificate as revoked. The command may be generated responsive to manipulation by the user of one or more input devices, such as the keyboard 324, to select an identity certificate in a certificate management application, to cause a menu to appear and to select a "Mark this Certificate Revoked" menu item from the menu. Responsive to receiving the command, the processor 328 determines (step 504) whether the selected identity certificate is the authentication certificate 124.

As will be clear to a person of ordinary skill in the art, only one authentication certificate can be used at a time. A user could have more than one identity certificate and each of the more than one identity certificate could be used as an authentication certificate, but the user can only enable one identity certificate as the authentication certificate at a time.

Where the processor 328 determines (step 504) that the selected identity certificate is the authentication certificate 124, the processor 328 requests confirmation (step 506) from the user, for example, through controlling the display 326 to show a dialog box, that the user indeed intends to mark the authentication certificate 124 revoked. The dialog may indicate the consequence of marking the authentication certificate 124 revoked and give the user an opportunity to either confirm the marking or cancel. For example, the dialog may include text such as "Revoking this certificate will cause this device to become locked. Do you wish to proceed?-Proceed-Cancel-"

Responsive to determining (step 508) that the user has confirmed the marking, the processor marks (step 510) the authentication certificate 124 revoked. More specifically, the processor 328 amends a status field in the status indicator 126 so that the status field indicates that the authentication certificate 124 has been revoked.

Another process executing on the processor 328 and whose details are outside the scope of this disclosure may recognize that the authentication certificate 124 has been revoked and may, responsively, lock the user device 100.

Responsive to determining (step 504) that the selected identity certificate is not the authentication certificate 124, the processor 328 determines (step 512) whether the selected identity certificate is in the certificate chain of the authentication certificate 124. Where the processor 328 determines (step 512) that the selected identity certificate is in the certificate chain of the authentication certificate 124, the processor 328 requests confirmation (step 506) from the user, for example, through controlling the display 326 to show a dialog box, that the user indeed intends to mark the selected identity certificate revoked. The dialog may indicate the consequence of marking the selected identity certificate revoked and give the user an opportunity to either confirm the marking or cancel.

Responsive to determining (step 508) that the user has confirmed the marking, the processor marks (step 510) the selected identity certificate revoked. More specifically, the processor 328 amends a status field in a status indicator associated with the selected identity certificate so that the status field indicates that the selected identity certificate has been revoked.

Another process executing on the processor 328 and whose details are outside the scope of this disclosure may recognize that the selected identity certificate 124 has been revoked and may, responsively, lock the user device 100.

Responsive to determining (step 512) that the selected identity certificate is not in the certificate chain of the authentication certificate 124, the processor marks (step 510) the selected identity certificate revoked. More specifically, the processor 328 amends a status field in a status indicator associated with the selected identity certificate so that the status field indicates that the selected identity certificate has been revoked.

Figure 6:
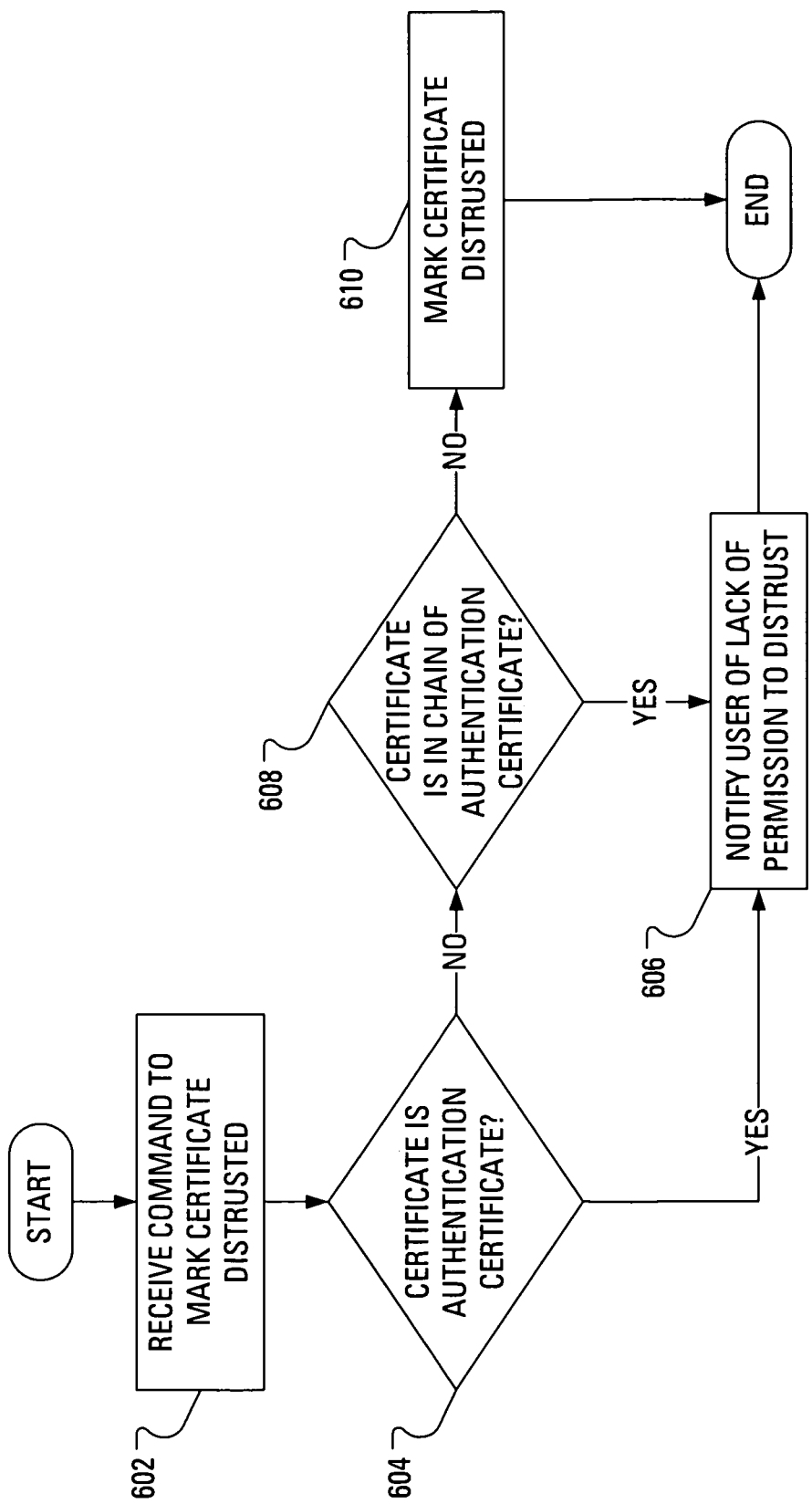
FIG. 6 illustrates steps of an example method of handling a certificate distrust request.

Steps of an example method of handling a certificate distrust request are presented in FIG. 6. Initially, the processor 328 receives (step 602) a command to mark a specific identity certificate as distrusted. The command may be generated responsive to manipulation by the user of one or more input devices, such as the keyboard 324, to select an identity certificate in a certificate management application, to cause a menu to appear and to select a "Mark this Certificate Distrusted" menu item from the menu. Responsive to receiving the command, the processor 328 determines (step 604) whether the selected identity certificate is the authentication certificate 124.

Where the processor 328 determines (step 604) that the selected identity certificate is the authentication certificate 124, the processor 328 indicates (step 606) to the user, for example, through controlling the display 326 to show a dialog box, that, as a consequence of distrusting the selected identity certificate, the user device 100 would become locked and that, accordingly, the user lacks permission to mark the authentication certificate 124 distrusted.

Responsive to determining (step 604) that the selected identity certificate is not the authentication certificate 124, the processor 328 determines (step 608) whether the selected identity certificate is in the certificate chain of the authentication certificate 124. Where the processor 328 determines (step 608) that the selected identity certificate is in the certificate chain of the authentication certificate 124, the processor 328 indicates (step 606) to the user that, as a consequence of distrusting the selected identity certificate, the user device 100 would become locked and that, accordingly, the user lacks permission to mark the authentication certificate 124 distrusted.

Responsive to determining (step 608) that the selected identity certificate is not in the certificate chain of the authentication certificate 124, the processor 328 marks (step 610) the selected identity certificate distrusted. More accurately, the processor 328 amends a status field in a status indicator associated with the selected identity certificate so that the status field indicates that the selected identity certificate has been distrusted.

Figure 7:
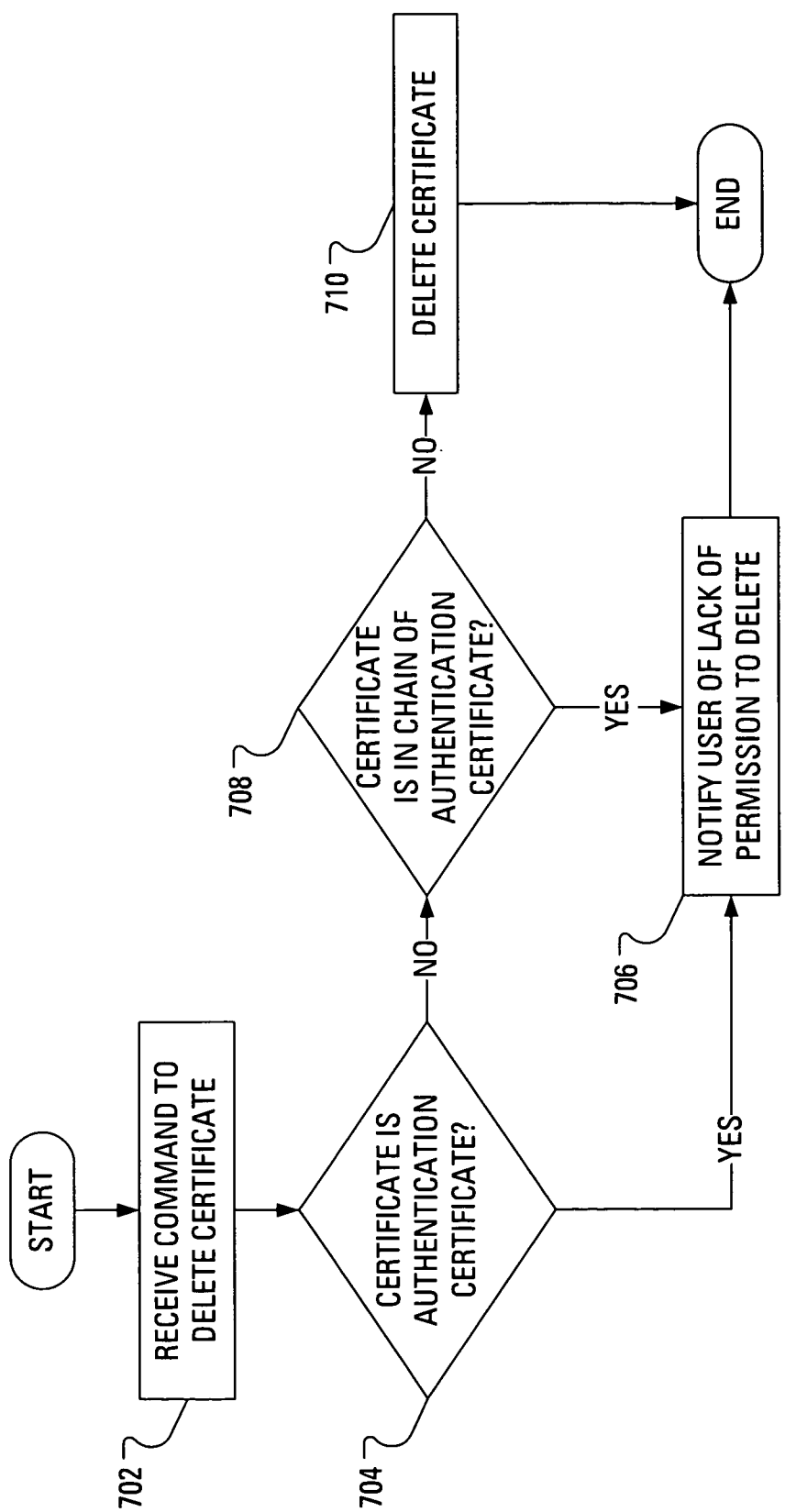
FIG. 7 illustrates steps of an example method of handling a certificate delete request.

Steps of an example method of handling a certificate delete request are presented in FIG. 7. Initially, the processor 328 receives (step 702) a command to delete a specific identity certificate. The command may be generated responsive to manipulation by the user of one or more input devices, such as the keyboard 324, to select an identity certificate in a certificate management application, to cause a menu to appear and to select a "Delete this Certificate" menu item from the menu. Responsive to receiving the command, the processor 328 determines (step 704) whether the selected identity certificate is the authentication certificate 124.

Where the processor 328 determines (step 704) that the selected identity certificate is the authentication certificate 124, the processor 328 indicates (step 706) to the user, for example, through controlling the display 326 to show a dialog box, that, as a consequence of deleting the selected identity certificate, the user device 100 would become locked and that, accordingly, the user lacks permission to delete the authentication certificate 124.

Responsive to determining (step 704) that the selected identity certificate is not the authentication certificate 124, the processor 328 determines (step 708) whether the selected identity certificate is in the certificate chain of the authentication certificate 124. Where the processor 328 determines (step 708) that the selected identity certificate is in the certificate chain of the authentication certificate 124, the processor 328 indicates (step 706) to the user that, as a consequence of deleting the selected identity certificate, the user device 100 would become locked and that, accordingly, the user lacks permission to delete the authentication certificate 124.

Responsive to determining (step 708) that the selected identity certificate is not in the certificate chain of the authentication certificate 124, the processor 328 deletes (step 710) the selected identity certificate. Furthermore, the processor 328 deletes a status indicator associated with the selected identity certificate.

In review, anytime a user attempts to delete, distrust or revoke a selected certificate from a certificate management application, the processor 328 determines whether the selected certificate meets certain criteria, such as the selected certificate being the authentication certificate 124 or being in the certificate chain of the authentication certificate 124. If the selected certificate meets the criteria, the processor 328 may notify the user of a lack of permission to perform the requested operation and may prevent the operation from completing.

In accordance with various alternate embodiments, the operation (e.g., revoking a certificate as shown in FIG. 5, or deleting a certificate, or distrusting a certificate) may be allowed to be completed after presenting a warning and indicating consequences to the user and receiving confirmation from the user to proceed. Such an alternate method allows the user to elect whether or not to proceed with the revocation, deletion or distrust of the selected certificate. This alternate method may be useful where the user wishes to quickly establish the user device 100 as inaccessible to an attacker. By revoking, deleting or distrusting the authentication certificate 124, the user device 100 becomes permanently locked and the attacker has no way to gain access to the user device 100.

A user of the user device 100 may also be permanently locked out of the user device 100 if the authentication certificate 124 expires. To avoid the lock out of the user device 100 when the authentication certificate 124 becomes expired, the processor 328 warns the user to renew the authentication certificate 124 on login of his or her user device 100. The warnings may be arranged to be presented at various time periods, e.g., one month before the authentication certificate 124 expires, one week before the authentication certificate 124 expires, one day before the authentication certificate 124 expires and one hour before the authentication certificate 124 expires, etc. When choosing an authentication certificate, a warning may be presented; for example, if the certificate expires in the next six months, the user will be prompted with a message such as "This certificate expires on (Date here). Update your authentication certificate before it expires. Failure to do so will cause your device to lock permanently." In an alternate embodiment, the dialog presented by the processor 328 requests that the user indicate whether continued use of the selected certificate is desired or selection of another certificate is desired.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of managing identity certificates on a device, said method comprising:

storing, in a memory of the device, an identity certificate, wherein a public key is associated with the identity certificate, and a corresponding private key is stored on a security token;

storing, in the memory of the device, a status indicator that includes status information for the identity certificate;

detecting, at said device, receipt of a status change command that will lead to a change in the status indicator from a current status to a new status;

determining that said identity certificate is an authentication certificate or is in a certificate chain of an authentication certificate;

responsive to the determining:
  providing, via a user interface of said device, a prompt for confirmation of said status change command; and
  indicating, via said user interface of said device in conjunction with said prompt, that access to all data stored on said device will be denied to all responsive to said change in the status indicator.

2. The method of claim 1 further comprising preventing said change in the status indicator.

3. The method of claim 1 further comprising:
  receiving a confirmation to proceed with performance of said status change command; and
  responsive to said receiving said confirmation, performing said status change command.

4. The method of claim 1 wherein said status change command comprises a command to revoke said certificate.

5. The method of claim 1 wherein said status change command comprises a command to distrust said certificate.

6. The method of claim 1 wherein said status change command comprises a command to delete said certificate.

7. The method of claim 1 wherein said current status is "valid".

8. The method of claim 1 wherein said new status is "revoked".

9. The method of claim 1 wherein said new status is "distrusted".

10. A system comprising a mobile communication device and a security token, the mobile communication device comprising:
  a memory storing:
    an identity certificate, wherein a public key is associated with the identity certificate, and a corresponding private key is stored on the security token; and
    a status indicator that includes status information for the identity certificate; and
  a processor for executing a certificate management application, said certificate management application being adapted to:
    detect receipt of a status change command that will lead to a change in the status indicator from a current status to a new status;
    determine that said identity certificate is an authentication certificate or is in a certificate chain of an authentication certificate;
    provide, via a user interface of said device, a prompt for confirmation of said status change command; and
    indicate, via said user interface of said mobile communication device in conjunction with said prompt, that access to all data stored on said mobile communication device will be denied to all responsive to said change in the status indicator.

11. The mobile communication device of claim 10 wherein the processor is further adapted to prevent said change in the status indicator.

12. The mobile communication device of claim 10 wherein the processor is further adapted to:
  receive a confirmation to proceed with performance of said status change command; and
  perform said status change command.

13. The mobile communication device of claim 10 wherein said status change command comprises a command to revoke, distrust or delete said certificate.

14. The mobile communication device of claim 10 wherein said current status is "valid".

15. The mobile communication device of claim 10 wherein said new status is "revoked" or "distrusted".

16. A non-transitory computer readable medium containing computer-executable instructions that, when performed by a processor in a mobile communication device including a memory storing an identity certificate and a status indicator that includes status information for the identity certificate, wherein a public key is associated with the identity certificate, and a corresponding private key is stored on a security token, cause said processor to execute a certificate management application, said certificate management application being adapted to:
  detect, at said mobile communication device, receipt of a status change command that will lead to a change in the status indicator from a current status to a new status;
  determine that said identity certificate is an authentication certificate or is in a certificate chain of an authentication certificate;
  responsive to the determining:
    provide, via a user interface of said device, a prompt for confirmation of said status change command; and
    indicate, via said user interface of said mobile communication device in conjunction with said prompt, that access to all data stored on said mobile communication device will be denied to all responsive to said change in the status indicator.

17. The non-transitory computer readable medium of claim 16 wherein the instructions further cause the processor to prevent said change in the status indicator.

18. The non-transitory computer readable medium of claim 16 the instructions further cause the processor to:
  receive a confirmation to proceed with performance of said status change command; and
  perform said status change command.

19. The non-transitory computer readable medium of claim 16 wherein said status change command comprises a command to revoke, distrust or delete said certificate.

20. The non-transitory computer readable medium of claim 16 wherein said new status is "revoked" or "distrusted".

* * * * *